(12) United States Patent
Sakurai et al.

(10) Patent No.: US 7,542,074 B2
(45) Date of Patent: Jun. 2, 2009

(54) PHOTOGRAPHED IMAGE PROJECTION DEVICE WHICH SETS A FRAME FREQUENCY OF PHOTOGRAPHING BY A CAMERA BASED ON MOVEMENT IN A PHOTOGRAPHED IMAGE

(75) Inventors: Keiichi Sakurai, Akishima (JP); Akihiko Nagasaka, Musashimurayama (JP); Tetsuji Makino, Ome (JP); Yoshihiro Teshima, Tokorozawa (JP); Kazumasa Morichika, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 473 days.

(21) Appl. No.: 10/928,226

(22) Filed: Aug. 27, 2004

(65) Prior Publication Data

US 2005/0047775 A1 Mar. 3, 2005

(30) Foreign Application Priority Data

Aug. 28, 2003 (JP) .............................. 2003-305575

(51) Int. Cl.
*H04N 5/228* (2006.01)
(52) U.S. Cl. .............................. 348/222.1; 348/208.99
(58) Field of Classification Search .............. 348/333.1, 348/220.1, 208.99; 396/430; 353/20
See application file for complete search history.

(56) References Cited

U.S. PATENT DOCUMENTS 4,930,013 A 5/1990 Leaning
7,044,605 B2 * 5/2006 Olson et al. .................... 353/30
7,075,567 B2 * 7/2006 Hunter et al. .......... 348/208.13
7,187,343 B2 * 3/2007 Pate .......................... 345/1.2

FOREIGN PATENT DOCUMENTS

| | | |
|---|---|---|
| EP | 0 272 794 A1 | 6/1988 |
| JP | 08-037617 A | 2/1996 |
| JP | 10-276367 A | 10/1998 |
| JP | 2001-109422 A | 4/2001 |
| JP | 2002-354331 A | 12/2002 |

OTHER PUBLICATIONS

Jonas, H. W., "A Conditional Replenishment Hadamard Video Compressor" Proceedings of the Society of Photo-optical Instrumentation Engineers. Applications of Digital Image Processing, XX, XX, vol. 119,Aug. 25, 1977, pp. 91-98, XP002071018.
Japanese Office Action dated Dec. 11, 2007 issued in a counterpart Japanese Application.
Japanese Office Action dated Apr. 22, 2008 issued in counterpart Japanese Appln. No. 2003-305575.

* cited by examiner

*Primary Examiner*—Tuan V Ho
(74) *Attorney, Agent, or Firm*—Frishauf, Holtz, Goodman & Chick, P.C.

(57) ABSTRACT

A computer obtains a change amount of an image of a manuscript. If the change amount of the image of the manuscript is equal to or larger than a predetermined threshold, the computer determines that the image has movement, such as in a case where the manuscript is replaced, and switches the resolution of the image, which is possible to shorten the processing time, to low resolution. In a case where the manuscript is placed on a base, if the change amount of the image of the manuscript is less than the predetermined threshold, and the computer determines that the image does not have movement, the computer switches the resolution of the image to high resolution.

6 Claims, 4 Drawing Sheets

PHOTOGRAPHED IMAGE PROJECTION DEVICE WHICH SETS A FRAME FREQUENCY OF PHOTOGRAPHING BY A CAMERA BASED ON MOVEMENT IN A PHOTOGRAPHED IMAGE

BACKGROUND OF THE INVENTION

1. Field of the Invention

The present invention relates to a photographed image projection device, a processing method of the photographed image projection device, and a program.

2. Description of the Related Art

Recently, there are photographed image projection devices that photograph with a camera, a manuscript placed on a manuscript base by a user, carries out image processing, storing the image data of the manuscript photographed by the camera, and project the image of the manuscript on the screen using a projector, enlarging the image. (For example, refer to pages 2 to 3, and FIG. 1 of Unexamined Japanese Patent Application KOKAI Publication No. 2002-354331).

However, with this kind of conventional photographed image projection device, because time is required to carry out processing of projecting the image of the manuscript to the screen, the frame frequency of the image becomes low.

SUMMARY OF THE INVENTION

The present invention has been made in consideration of the above, and an object of the present invention is to provide a photographed image projection device which can shorten the processing time until an image obtained by photographing is projected, an image processing method of the photographed image projection device, and a program.

To achieve the above object, a photographed image projection device that projects an image of a photographed object, to a screen, according to a first aspect of the present invention, comprises:

a camera which photographs the subject, and outputs the image data of the photographed subject;

an image processing unit which carries out image processing to the image data that the camera outputs;

a projection unit which projects an image based on the image data that the image processing unit processes, to the screen; and a control unit which controls the camera, the image processing unit and the projection unit, so that the frame frequency of the image photographed by the camera is switched to at least two frequencies.

An image processing method for a photographed image projection device, according to a second aspect of the present invention, comprises:

a determining step of determining whether an image has movement or not, based on image data that a camera outputs; and a step of setting high/low of frame frequency of the image that the camera outputs, in advance, to control the camera so that the frame frequency of the image photographed by the camera becomes high, in a case where it is determined that the image has movement, and to control the camera so that the frame frequency of the image becomes low, in a case where it is determined that the image does not have movement.

A program according to a third aspect of the present invention is for controlling a computer to execute:

a determining procedure of determining whether an image has movement or not, based on image data that a camera outputs; and a procedure of setting high/low of frame frequency of the image that the camera outputs, in advance, to control the camera so that the frame frequency of the image photographed by the camera becomes high, in a case where it is determined that the image has movement, and to control the camera so that the frame frequency of the image becomes low, in a case where it is determined that the image does not have movement.

BRIEF DESCRIPTION OF THE DRAWINGS

This object and other objects and advantages of the present invention will become more apparent upon reading of the following detailed description and the accompanying drawings in which.

DETAILED DESCRIPTION OF THE PREFERRED EMBODIMENT

Below, a photographed image projection device according to an embodiment of the present invention will be described with reference to the drawings.

Figure 1:
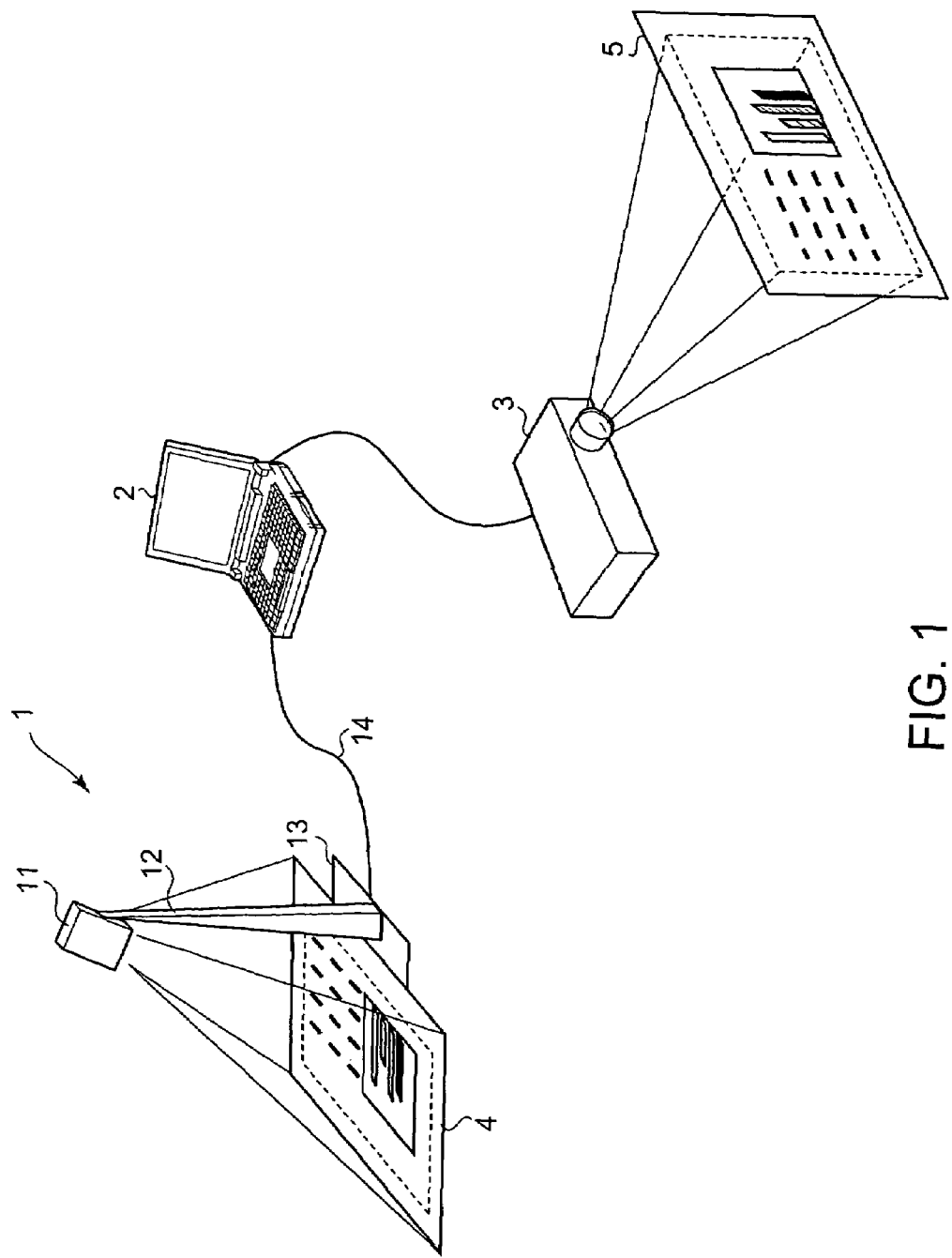
FIG. 1 is a diagram showing the entire structure of a photographed image projection device according to an embodiment of the present invention.

The structure of the photographed image projection device according to the present embodiment is shown in FIG. 1.

The photographed image projection device comprises a document camera 1, a computer 2, and a projector 3.

The document camera 1 is a camera system for imaging a manuscript 4, which is a projection target, and comprises a digital camera 11, a strut 12, and a base 13. The digital camera 11 is for imaging the manuscript 4, the strut 12 is for fixing the digital camera 11 thereto, and the base 13 is for supporting the strut 12.

Figure 2:
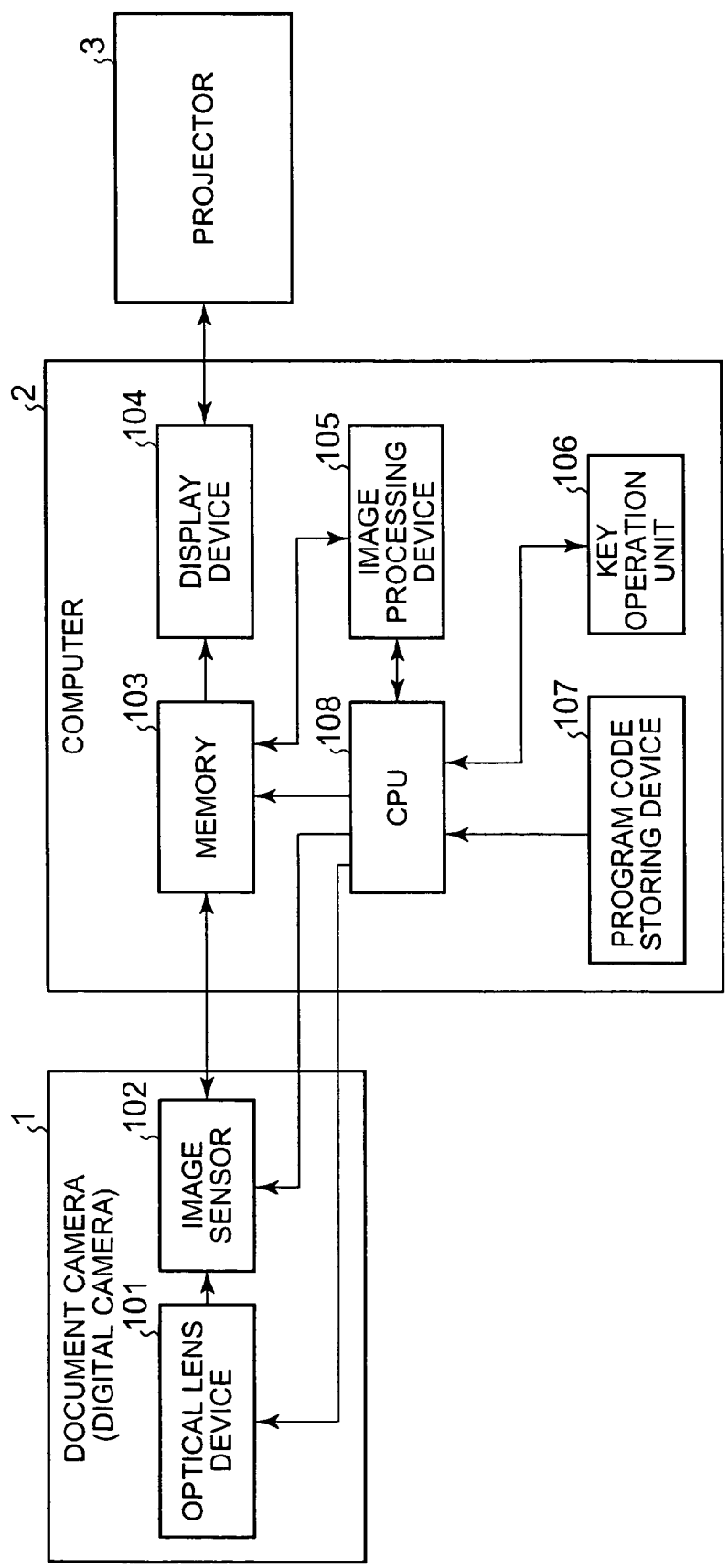
FIG. 2 is a block diagram showing the structure of a document camera and a computer.

As shown in FIG. 2, the digital camera 11 of the document camera 1 comprises an optical lens device 101 and an image sensor 102.

The optical lens device 101 includes a lens, etc. for collecting the light of the image.

The image sensor is for acquiring the image imaged by the optical lens device 101 collecting light, as digitalized image data, and comprises CCD (Charge-Coupled Devices), etc.

The document camera 1 and the computer 2 are connected via a cable 14, such as a USB (Universal Serial Bus), etc., and the document camera 1 outputs the image data of the manuscript 4 that the digital camera 11 images, to the computer 2, via the cable 14.

The computer 2 performs image processing towards the image data sent from the document camera 1. The computer 2 generates image data of the manuscript 4 imaged from the front, by performing image processing, even if the manuscript is tilted or rotated. As shown in FIG. 2, the computer 2 comprises a memory 103, a display device 104, an image processing device 105, a key operation unit 106, a program code storing device 107, and a CPU (Central Processing Unit) 108.

The memory 103 is for temporarily storing images from the image sensor 102, and images to be sent to the display device 104. The memory 103 is used as an operation memory of the CPU 108.

The display device 104 is for sending an image to the projector 3.

The image processing device 105 is for carrying out image processing such as distortion adjustment and image effects, towards the image data temporarily stored in the memory 103.

The key operation unit 106 comprises switches and keys for controlling the functions for document projection. The key operation unit 106 outputs the operation information of the switch/key that the user operates, to the CPU 108.

The program code storing device 107 is for storing the program that the CPU 108 executes, and comprises a ROM (Read Only Memory) etc.

The CPU 108 controls each above-described unit, in accordance with the program stored in the program code storing device 107.

The CPU 108 determines whether the image of the manuscript 4, which is the imaging target, has movement or not, in accordance with the later-described flowchart, and switches the projection mode in accordance with the determination result.

The projection mode has two modes, which are the movie mode and the still image mode. The movie mode projects the image that the digital camera 1 shows, and is set in a case where a user places a manuscript 4, etc., that he/she wants to project, to the base 13.

At the movie mode, the CPU 108 controls each unit so that for example, an image that has an image resolution of approximately VGA (Video Graphics Array) (600×480 dots) is movie projected at a speed of 30 fps (frame/second). In this way, though the resolution is low, the movie mode places emphasis on real-time.

The still image mode is for carrying out image photographed with a high resolution, with the digital camera 11 and carrying out projection of the high resolution still image, and is set after the user places the manuscript 4. In a case where the digital camera 11 is a camera with an imaging resolution of 3 million pixels, the cut projection image becomes a still image of XGA (eXtended Graphics Array) (1024×768 dots).

The CPU 108 determines whether the image of the manuscript 4 has movement or not, so as to carry out switching of the projection mode. To carry out the determination, the CPU 108 obtains a change amount MD compared to the image photographed the previous time. The change amount (MD) indicates the amount that the photographed image has changed, compared to the image photographed the previous time. There are several methods for calculating this amount. For example, the CPU 108 obtains the summation of absolute value of difference of each pixel, from the data of the previously photographed image, as the change amount MD.

Namely, if the pixel data of the previous time is Pn−1 (x, y), and the pixel data of this time is Pn (x, y), $1 \leq x \leq 640$, $1 \leq y \leq 480$, the change amount MD is expressed by the next Formula 1.

$$MD = \sum_{x=1}^{640} \sum_{Y=1}^{480} |P_n(x, y) - (P_{n-1}(x, y)|$$ [Formula 1]

However, because the calculation amount is too large to obtain the summation of every pixel, as a method of obtaining the change amount MD, there is a method of extracting a predetermined number of pixels to obtain the change amount MD.

As a threshold for determining whether there is movement or not, comparing it with the change amount MD, a threshold Thresh1 and a threshold Thresh2, are set in advance. The threshold Thresh1 is for determining whether there is movement or not. The CPU 108 determines that there is no movement, in a case where the change amount MD is less than the threshold Thresh1.

The threshold Thresh2 is for determining whether it is necessary to switch to the movie mode, when there is slight movement, such as for example, a shadow moving or a pen, etc., being placed, at a still image mode.

In a case where the change amount MD is lower than the threshold Thresh2, the CPU 108 determines that the movement is slight movement, and it is not necessary to switch to the movie mode. The threshold Thresh2 is set higher than the threshold Thresh1 (Thresh 1<Thresh 2). The memory 103 stores the threshold Thresh1 and the threshold Thresh2 in advance.

In a case where the CPU 108 performs switching from the movie mode to the still image mode, the CPU 108 determines that the image has no movement, and performs the switching after a predetermined time has passed. Therefore, the CPU 108 counts still time Ptime, after determining that the image does not have movement. Then, the memory 103 stores a predetermined Hold Time, which is set in advance so as to compare with the still time Ptime.

The projector 3 is for imaging the image of the manuscript 4, by radiating the projection light to the screen 5. The computer 2 and the projector 3 are connected via a cable, such as RBG, etc.

Next, the operation of the photographed image projection device according to the present embodiment will be described.

When the user turns on the photographed image projection device, the CPU 108 of the computer 2 reads a program code from the program code storing device 107 to execute basic projection processing.

Figure 3:
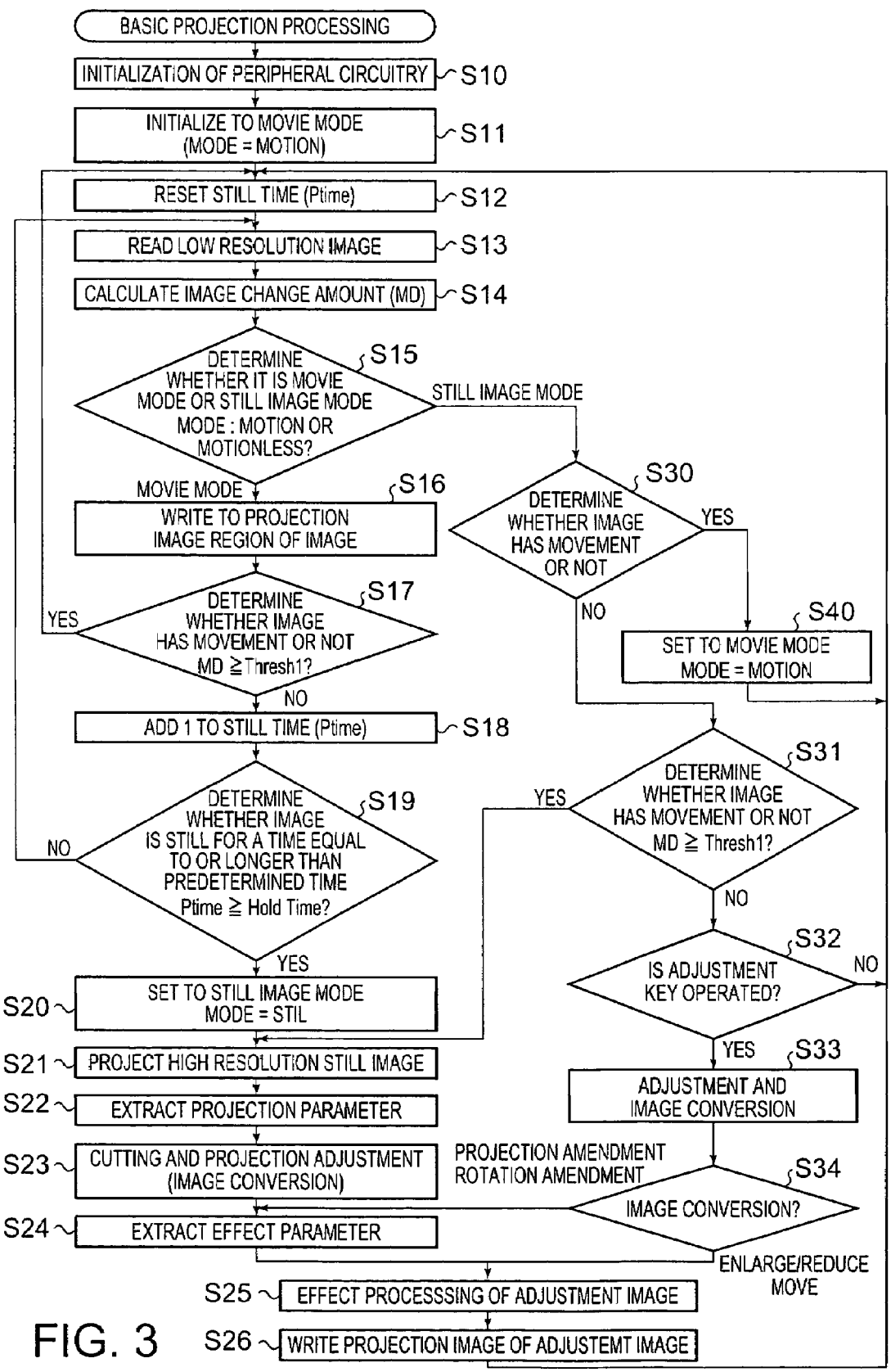
FIG. 3 is a flowchart showing the content of basic projection processing that the photographed image projection device shown in FIG. 1 executes.

This operation will be described with reference to the flowchart shown in FIG. 3.

First, the CPU 108 carries out initialization of camera setting parameter, such as focus, exposure, and white balance of the digital camera 11 of the document camera 1 (step S10).

The CPU 108 initializes the projection mode to the movie projection mode (step S11). To initialize the projection mode to the movie mode, the CPU 108 sets the movie mode (Motion) to a designated area in the memory 103. Further, the CPU 108 sets the image data read by the image sensor 102 of the digital camera 11, so that the image data becomes image data by VGA.

By this, the scene captured by the digital camera 11 is collected to the image sensor 102, via the optical lens device 101. The image sensor 102 creates a digital image with low resolution for movie shooting, from the collected image. Then, the image sensor 102 periodically sends the created digital image to the memory 103, at for example, 10 images per second.

Next, the CPU 108 resets the still time Ptime (step S12).

The CPU 108 controls the image sensor 102 and the memory 103 so that the image data with low resolution is transferred from the image sensor 102 to the memory 103 (step S13). Here, only the image data of the image sensor 102 is transferred to the predetermined region of the memory 103, and the display device 104 does not display the image. The reason that the display device 104 does not display the image, is because the image data for the displaying device 104 to perform displaying of the image, is stored in a region indicated by an address different from the predetermined region in memory 103.

The CPU 108 obtains the change amount (MD) with the image photographed the previous time, in accordance with Formula 1 (step S14).

The CPU 108 determines whether the projection mode is the movie projection mode or the still image projection mode (step S15).

In the initial state, the movie projection mode is set as the projection mode. Therefore, the CPU 108 determines that the projection mode is in the movie mode (Step S15: movie mode), and copies the image data of the moving images in the memory 103 to a predetermined region in the memory 103, to project the photographed moving images (step S16). By this, the display device 104 reads the photographed image data from the memory 103, and outputs an RGB signal to the projector 3, based on the read image data. The projector 3 projects the image based on this signal.

The CPU 108 compares the above-described threshold Thresh1, which is set in advance, with the image change amount MD obtained in step S14, to determine whether the image has movement or not, based on the comparison result (step S17).

At this time, in a case where the user is still continuing movement, such as placing paper, the image change amount MD becomes equal to or larger than threshold Thresh1. In this case, the CPU 108 determines that the image has movement (step S17: YES), and resets the still time Ptime to perform reading of image data of low resolution. Then, the CPU 108 obtains the image change amount MD from the read image data, and performs writing to the projection image region of the memory 103 (step S12 to S16). By this, while the user is carrying out movement, the photographed image projection device continues to maintain the state of the movie mode. By this, a movie image with low resolution is projected on the screen 5.

Thereafter, when the user finishes setting the paper, and the image no longer has movement, the image change amount MD becomes less than the threshold. In this case, the CPU 108 determines that the image does not have movement (step S17: NO), and adds one to the still time Ptime (step S18).

Then, the CPU 108 determines whether the still time Ptime has reached a predetermined time Hold Time (step S19).

In a case where the CPU 108 determines that the still time Ptime has not reached the predetermined Hold Time (step S19:NO), the CPU 108 continues to re-read the image data of low resolution, until it determines that the image does not have movement. Then, the CPU 108 obtains the image change amount MD from the read image data, and if there is no movement, adds one to the still time Ptime (step S13 to S18). In this case, because the still time PTime is not reset, the still time PTime is counted up each time a moving image is read by the CPU 108.

In a case where the CPU 108 determines that still time PTime has reached the predetermined time Hold Time (step S19:YES), the CPU 108 determines that the image is still, and sets the projection mode to the still image mode (step S20).

The CPU 108 controls the image sensor 102, so as to photograph a still image with high resolution (step S21). Then, the CPU 108 writes the image data that the image sensor 102 obtains, to the memory 103. After writing the image data to the memory 103, the CPU 108 returns the resolution of the digital camera 11, once again to reading state of low resolution.

The CPU 108 controls the image processing device 105, to carry out extraction of projection parameter for inclination adjustment, towards the read still image with high resolution (step S22).

In accordance with the extracted projection parameter, the image processing device performs cutting of the photographed target and projection adjustment, which is creation of adjustment image of the front side image (step S23).

The image processing device 105 extracts the parameter used in image effect processing, such as contrast adjustment processing, etc., which carries out conversion to images that are clear and can be easily distinguished, from the created adjustment image (step S24).

The image processing device 105 uses the extracted image effect parameter to perform image effect processing of the adjustment image (step S25).

In order to project the adjusted image data that is subjected to effect processing, in the same way as the time of the movie image, the CPU 108 writes the adjustment image data to a predetermined region in the memory 103. Then, the CPU 108 outputs the image from the display device 104, with an RGB signal, to the projector 3 (step S26).

Once it becomes the still image mode, the CPU 108 once again resets the still time Ptime, and reads the image of low resolution, to obtain the image change amount MD from the read image (step S12 to S14).

Here, in a case where the CPU 108 determines that the projection mode is the still image projection mode (step S15), the CPU 108 carries out comparison of the obtained image change amount MD with the other predetermined threshold Thresh2 (Thresh1<Thresh2), to determine whether the image has movement or not (step S30).

In a case where the image change amount is less than the threshold Thresh2, the CPU 108 determines that the image does not have movement (step S30:NO). In this case, the CPU 108 continues to perform comparison of the image change amount with the threshold Thresh1, to determine whether the image has movement or not (step S31).

In a case where image change amount MD is equal to or larger than threshold Thresh2, the CPU 108 determines that the image has movement (step S30:YES), and sets the projection mode to the movie mode (step S40). Then, the CPU resets the still time Ptime (step S12).

On the other hand, even if the image change amount MD is less than the threshold Thersh2 (step S30:NO), if the image change amount MD is equal to or more than threshold Thresh1, the CPU 108 determines that the image has movement (step S31:YES). In this case, because the image change amount MD is in between the threshold Thresh1 and the threshold Thresh2, the still image is once again photographed at high resolution, without switching the projection mode to the movie mode. Then, the image processing device 105 performs image processing of the obtained high resolution still image data (step S21 to S26).

In a case where the image change amount MD is less than the threshold Thresh2 (step S30:NO), and less than the threshold Thresh1, the CPU 108 determines that the still state is continuing (step S31:NO). In this case, the CPU 108 determines whether the image adjustment key is operated or not, based on the operation information output from the key operation unit 106 (step S32).

In a case where it is determined that the image adjustment key is not operated (step S32:NO), the CPU 108 returns to step S12, and resets the still time Ptime.

In a case where it is determined that the image adjustment key is operated (step S32:YES), the CPU 108 carries out image conversion such as enlarging and rotating the image (step S33).

The CPU 108 determines whether the image conversion is projection adjustment or rotation adjustment, etc., or whether the image is enlarged/reduced or moved (step S34).

In a case where it is determined that the image conversion is projection adjustment, or rotation adjustment, etc., (Step S34:projection adjustment/rotation adjustment), the CPU 108 performs image effect processing using the image effect parameter extracted by the previous image, to perform effect processing of the adjustment image (step S25). On the other hand, in a case where it is determined that the image conversion is enlarging/reducing or moving the image (Step S34: enlarging/reducing/moving), the CPU 108 performs image effect processing without using the image effect parameter extracted by the previous image (step S25).

In this way, the CPU 108 performs projection control, while carrying out switching of the movie projection mode and the still image projection mode. By this, projection of the image, wherein the frame frequency is the priority, is performed while the user is carrying out operation. On the other hand, in a case where the image becomes still, cutting processing and image effect processing of the manuscript 4, which is the photographed target, is performed, to perform projection of a high resolution image.

As described above, according to the present embodiment, images with different resolution, frame frequency, and image processing, are projected by performing switching. Therefore, when projecting the image of the manuscript to the screen, the manuscript can be projected at a high quality image. In a case where the manuscript is replaced, the image with priority frame frequency is projected, and the processing time can be reduced.

Further, because the switching of a plurality of images are carried out by automatically detecting the movement of the photographed target, the trouble of the user having to switch the image projection mode, can be prevented. Also, in a case where manuscript projection is carried out, because a high frame frequency is displayed while the manuscript is being replaced, the operation of switching, can be carried out smoothly, while viewing the projection image. Because the image is automatically switched to an image of a high quality, after the manuscript is placed, the image has a high level of visibility.

Also, because a part of the difference image of the low resolution image is used as movement of the target, the photographed image projection device can be realized by a simple structure.

Once the still image projection mode is set, the movement of the photographed target is determined based on two thresholds. By this, in a case where the movement of a shadow, or placing a pen, is slight, because the image is re-photographed at a high resolution, without via the movie projection mode, smooth re-projection becomes possible.

The present invention is not limited to the above embodiment, and various changes and modifications can be made.

Figure 4:
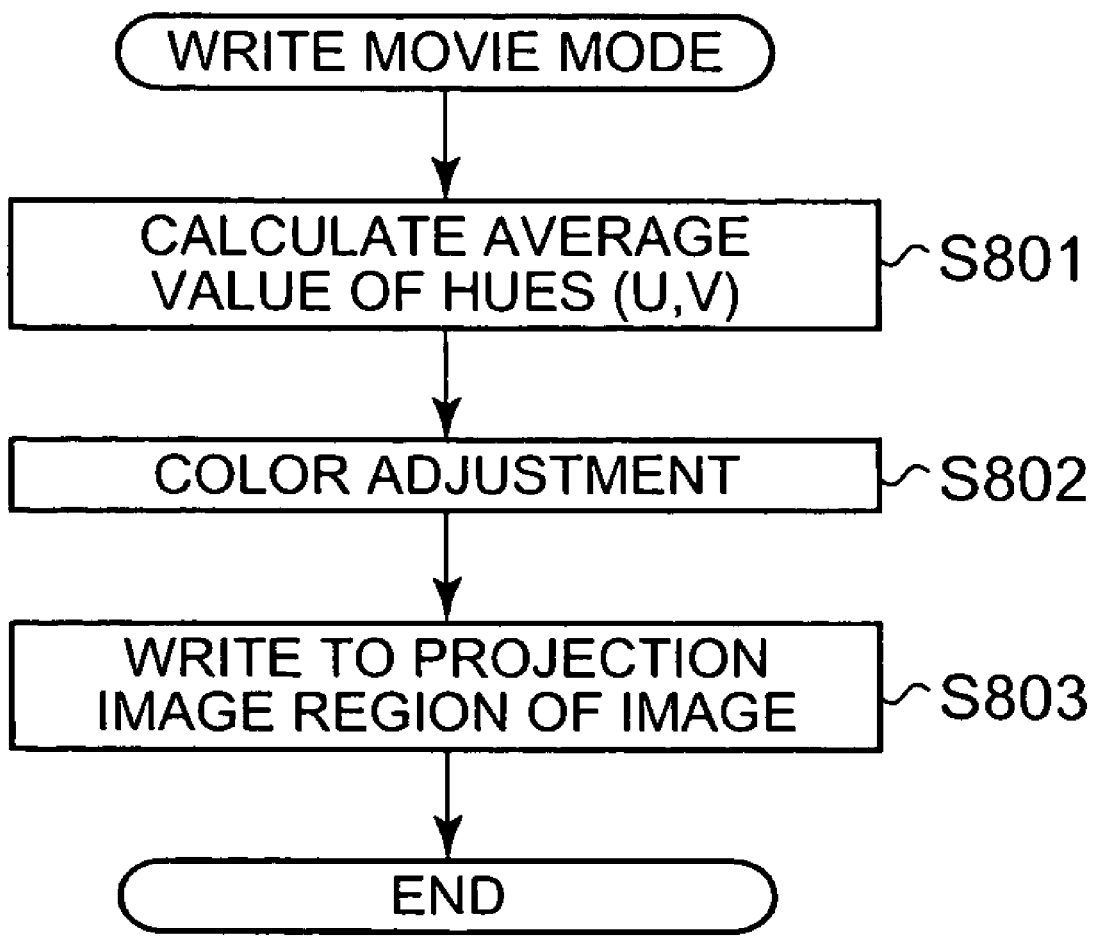
FIG. 4 is a flowchart showing an application example of the photographed image projection device shown in FIG. 1.

For example, image processing to an extent that does not require processing time, is possible. Namely, in step S16, the image processing device 105 performs only color adjustment. This processing content is shown in the flowchart shown in FIG. 4.

The image processing device 105 obtains the average value of hues (U,V) (step S801).

The image processing device 105 uses the average value, and carries out adjustment of the luminance histogram, in accordance with the background color, to carry out color adjustment (step S802).

The image processing device 105 writes the image that was subject to image effect, to the memory 103 (step S803). In this way, even in a case where an image of low resolution is projected, it is possible to carry out simple image processing and image effect to the image, if processing time is not required.

In the above embodiment, the threshold for comparing with the change amount MD is two. However, the threshold may be equal to or more than three, and the image processing device 105 may perform different image processing towards the image, in accordance with the amount of movement of the image.

The program for executing the above processing may be stored to a computer readable recording medium, such as a flexible disk, CD-ROM (Compact Disk Read-Only Memory), and DVD (Digital Versatile Disk), and distributed, so as to operate as the above described means or so as to execute the above described steps, by installing the program to a computer.

Or, the program may be stored to a disk device, etc., that a sever device connected to network such as the Internet, comprises, and may be downloaded, etc., to a computer by for example, embedding the program on a carrier wave.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are regarded to be in the scope of the present invention.

This application is based on Japanese Patent Application No. 2003-305575, filed on Aug. 28, 2003, and including specification, claims, drawings and summary. The disclosure of the above Japanese Patent Application is incorporated herein by reference in its entirety.

What is claimed is:

1. A photographed image projection device comprising:
   a camera which photographs an object and outputs image data;
   an image processing unit which carries out image processing on the image data output by the camera;
   a projection unit which projects an image based on the image data processed by the image processing unit; and
   a control unit which controls the camera, the image processing unit and the projection unit, so that a frame frequency of the image data output by the camera is switchable to at least two frequencies,
   wherein the control unit comprises a movement determining section which determines whether an image of the image data output by the camera has movement;
   wherein the control unit sets in advance, a high/low frame frequency of the image data output by the camera such that: (i) when the movement determining section determines that the image of the image data output by the camera has movement, the control unit controls the camera, the image processing unit, and the projection unit so that the image data is output by the camera with a high frame frequency, and (ii) when the movement determining section determines that the image of the image data output by the camera does not have movement, the control unit controls the camera, the image processing unit, and the projection unit so that the image data is output by the camera with a low frame frequency and so that an amount of data corresponding to a given image increases to thereby achieve a higher image resolution;

wherein the movement determining section obtains an image change amount of the image of the image data output by the camera; and wherein the movement determining section determines that the image of the image data output by the camera: (i) has movement, if the image change amount is at least equal to a first predetermined threshold amount; (ii) has a slight movement, if the image change amount is lower than the first predetermined threshold amount and at least equal to a second predetermined threshold amount; and (iii) does not have movement, if the image change amount is lower than the second predetermined threshold amount.

2. The photographed image projection device according to claim 1, wherein the movement determining section determines whether the image of the image data output by the camera has movement, based on the image data output by the camera with the high frame frequency, set in advance, and an image resolution corresponding to the high frame frequency.

3. An image processing method comprising:

determining whether an image has movement based on image data output by a camera; and setting, in advance, a high/low frame frequency of the image data output by the camera so that: (i) the image data is output by the camera with a high frame frequency when it is determined that the image has movement, and (ii) the image data is output by the camera with a low frame frequency and with an increased amount of data corresponding to a given image to thereby achieve a higher image resolution when it is determined that the image does not have movement;

wherein determining whether the image has movement comprises obtaining an image change amount of the image; and wherein it is determined that the image: (i) has movement, if the image change amount is at least equal to a first predetermined threshold amount; (ii) has a slight movement, if the image change amount is lower than the first predetermined threshold amount and at least equal to a second predetermined threshold amount; and (iii) does not have movement, if the image change amount is lower than the second predetermined threshold amount.

4. A computer-readable recording medium having a computer-readable program stored thereon for a photographed image projection device, the computer-readable for the photographed image projection device performing functions comprising:

determining whether an image has movement based on image data output by a camera; and setting, in advance, a high/low frame frequency of the image data output by the camera so that: (i) the image data is output by the camera with a high frame frequency when it is determined that the image has movement, and (ii) the image data is output by the camera with a low frame frequency and with an increased amount of data corresponding to a given image to thereby achieve a higher image resolution when it is determined that the image does not have movement;

wherein determining whether the image has movement comprises obtaining an image change amount of the image; and wherein it is determined that the image: (i) has movement, if the image change amount is at least equal to a first predetermined threshold amount; (ii) has a slight movement, if the image change amount is lower than the first predetermined threshold amount and at least equal to a second predetermined threshold amount; and (iii) does not have movement, if the image change amount is lower than the second predetermined threshold amount.

5. The photographed image projection device according to claim 1, wherein the projection unit projects the image to a screen.

6. The photographed image projection device according to claim 1, wherein the movement determining section stores previous image data and current image data output by the camera, and wherein the movement determining section obtains the image change amount for the current image data by obtaining a summation of a difference between values of the stored previous image data and corresponding values of the stored current image data.

* * * * *